J. A. LE ROY.
AUTOMATIC FILM VALVE.
APPLICATION FILED FEB. 26, 1917.
1,277,958.
Patented Sept. 3, 1918.
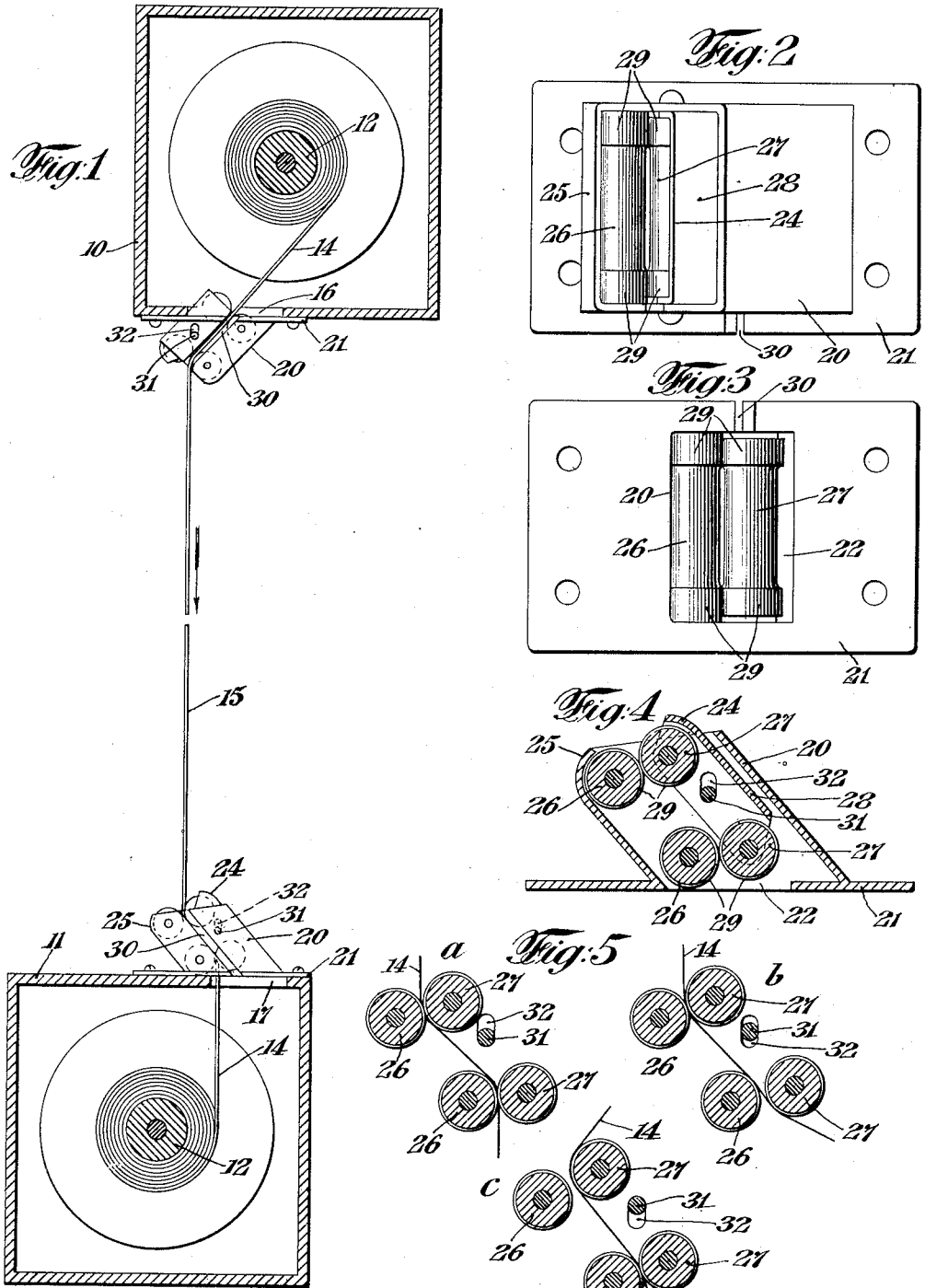
INVENTOR
Jean A. Le Roy
BY
ATTORNEY

UNITED STATES PATENT OFFICE.

JEAN A. LE ROY, OF NEW YORK, N. Y.

AUTOMATIC FILM-VALVE.

1,277,958.  Specification of Letters Patent.  Patented Sept. 3, 1918.

Application filed February 26, 1917.  Serial No. 151,062.

*To all whom it may concern:*

Be it known that I, JEAN A. LE ROY, a citizen of the United States, and a resident of New York, in the county of New York and State of New York, have invented certain new and useful Improvements in Automatic Film-Valves, of which the following is a specification.

The invention relates to fire prevention devices, for example as applied to motion picture apparatus or the like, more particularly to so-called film valves employed for the purpose of checking or preventing fire being communicated to the portion of a film within its magazine, or fireproof receptacle, should the exposed portion for any reason become ignited. These valves are generally provided with a plurality of rollers or other suitable anti-friction members mounted within a housing, for example one of which members is shiftable to place the film in contact with a companion roller. Experience has demonstrated that where such shiftable roller is employed, the said roller becomes displaced or separated from its companion roller under the changed direction of pull exerted thereon by the film in unwinding or winding from or upon its reel. This roller, in many instances, has been found to block from dirt or other causes in the displaced position, leaving an appreciable opening or passageway for the film and fire, and rendering the device as a means of protection against communication of fire to the magazine useless.

It is the object of the present invention to construct a protective device of this character which may be readily applied, for example to existing magazines, or constructed with same, and afford a film valve in which the aforesaid objectionable features are eliminated. A further object of the invention is to so arrange the active members thereof that the same will readily and positively assume the proper position for adequately protecting the portion of film within the magazines or receptacles irrespective of the varying directions of pull exerted upon the film as it is wound or unwound upon or from its reel within the fireproof receptacle or magazine.

In the accompanying drawings, which illustrate the invention—

Figure 1 is a view partly in vertical section of two complete magazines of a motion picture apparatus and arranged in the relative positions which they ordinarily occupy, each of said magazines being provided with the improved protection device or film valve for the film, which is indicated as coming from the upper fireproof magazine and extending into the lower one.

Fig. 2 is a plan of the film valve.

Fig. 3 is an underneath view.

Fig. 4 is a vertical section.

Fig. 5 is a diagrammatical view illustrating the action of the valve.

Similar characters of reference designate corresponding parts throughout the several views.

Referring to the drawings, 10 and 11 designate suitable fireproof receptacles, housings, magazines, or the like, of usual or special construction adapted to retain a film, a film reel, holder, or the like, as the spool 12, which is rotatably mounted therein, as is well understood. Upon these spools is the film 14, the same being as a rule unwound from the upper spool and wound upon the lower spool, or unwound and rewound within a single casing, leaving an intermediate portion 15 which passes through the projector portion of the motion picture machine (not shown). It is more particularly during its passage through the machine that the film is subject to ignition. In order to prevent, in such contingency, the fire from being communicated to either of the magazines 10 or 11 in which a considerable portion of film will be stored, each magazine is provided, at the portion where the film respectively leaves or enters same, with the valve device hereinafter described. This device is adapted to be securely attached to the respective magazines, which are provided, at the portion where the film leaves or enters, with suitable openings 16 and 17 respectively in the wall portion thereof, and which openings are adapted to register with corresponding openings of the base of the valve.

The valve employed for the purpose hereinbefore set forth consists essentially of a casing 20, usually made separate from its magazine and of metal or other non-inflammable substance, having a base or securing portion 21 conforming to the magazine wall to which it is to be attached, and provided with an opening 22 of substantial size and registering with the respective openings 16 and 17, the said base portion 21 covering entirely the said openings to the magazines so that access thereto is had only through the valve device 20, or in some forms of magazines also through a narrow lateral slit. The housing or frame portion 20 extends upwardly from the base portion 21, substantially at an angle of 45°, and supports the fire prevention means, it being preferred to round over the upper portion of the front of said housing and one end of the carriage to provide shields 24 and 25 which will, in a measure, serve to prevent access of foreign material to the mechanism contained within said housing.

This mechanism consists of two sets of anti-friction members, for example rollers, one set of two or more rollers 26 being fixed relatively to the housing, and having one of its members located at the entrance portion thereof, and another near the exit portion; and the plane of the axes of these rollers being inclined to the plane of the base and substantially parallel to the plane of the front and rear walls of the housing. Coöperating with the aforesaid anti-friction members or rollers 26 are similar members or rollers 27 which are rotatably mounted in an oscillatory carriage 28 so located and mounted within the said housing as to keep in constant contact with said film 14, a roller at one end thereof coöperating with its fixedly located companion roller and vice versa to hold the film therebetween, whereby the passageway through the housing is automatically varied to suit the particular conditions developed. The various anti-friction members or rollers are provided with end enlargements 29 whereby the intermediate picture portions are retained a sufficient distance from the faces of said members. The said film is thus allowed to pass freely through the passageway afforded, but there is no excess space whereby fire might be communicated or enter to the casing or magazine or the film be permitted to curl sufficiently to slip past the valve when ignited and into the corresponding casing or magazine. In order to facilitate the threading of the film, an inclined slot 30 is provided in one of the sides of the casing or housing for the rollers, substantially in a plane mid-way between the two sets of rollers and inclined to the base of the housing substantially at an angle of 45°. The carriage 28 is pivoted below its center of gravity, causing said carriage to be in unstable equilibrium and to oscillate with respect to the fixedly located sets of rollers. For this purpose, it is provided with trunnions 31 which extend laterally therefrom into bearings 32 in the sides of the housing, these bearings further being preferably in the nature of vertical slots or the like, in order that said carriage may partake of a vertical or reciprocatory motion in addition to its oscillatory motion. The carriage being mounted on its trunnions so as to be in unstable equilibrium, one of the rollers or anti-friction members carried thereby will be under a constant tendency to contact with its companion member of the fixedly located members, and thereby restricting the effective area of opening.

In view of the aforesaid mounting, different thicknesses of film will be readily accommodated; and, moreover, a variation in the direction of pull of the film on said roller and carriage will, if it should cause a separation of one set of companion rollers, provide for the closing of the other set and vice versa, (as indicated in Fig. 5) the carriage freely moving and returning, as the case may be, in the vertically slotted bearings or guiding means. As indicated in Fig. 5—position $a$—under normal conditions and when no considerable pull is exerted on the film, all rollers are active to effect a closure; whereas, in case the film should back up to separate one set of companion rollers,—position $b$—the carriage will lift and the unbalanced mounting thereof will maintain the other set in contact. Furthermore, in case of a pull being exerted in a direction effective to lift the carriage sufficiently to effect a separation of the previously closed set of companion rollers, said carriage being pivoted, it will cause a swing of the opposite portion of the carriage over to effect a closure between the roller carried at said portion with its companion roller of the fixedly located rollers—position $c$. It will be noted that in using the valve as an exit valve from the upper magazine, the carriage is in reversed position from that when the valve is used as an entrance valve to the lower magazine. This is more particularly for convenience in feeding the film to the projecting mechanism and to more effectively protect against entrance of fire to said upper magazine, as the said carriage will automatically close the entrance in case of exterior breakage or ignition of the film and continued feeding thereof.

It is to be understood that the protective device hereinbefore described is equally applicable for the protection of the receptacles or magazines of the well-known film-rewinding devices; and, furthermore, that its use is not limited to motion picture apparatus. Moreover, I do not wish to restrict myself to the particular mechanical details herein shown for effecting the oscillatory and reciprocatory motion of one of the co-acting anti-friction members.

I claim:

1. An automatic valve for fireproof receptacles or magazines, comprising: a suitable casing or housing having a passageway for a film or inflammable strip; and a double acting member floating and rocking with respect thereto and carrying means to vary said passageway.

2. An automatic valve for fireproof receptacles or magazines, comprising: a suitable casing or housing having a passageway for a film or inflammable strip; and a double acting member floating and rocking with respect thereto and carrying means to automatically vary said passageway at both ends.

3. An automatic valve for fireproof receptacles or magazines, comprising: a suitable casing or housing having a passageway for a film or inflammable strip; and a member floating and rocking with respect thereto and carrying means to substantially close the passageway at both ends.

4. An automatic valve for fireproof receptacles or magazines, comprising: a suitable casing or housing having a passageway for a film or inflammable strip; and means mounted in said housing to substantially close said passageway at both ends and including a movable member adapted also to substantially close said passageway at one end and open same at the other end, and vice versa.

5. An automatic valve for fireproof receptacles or magazines, comprising: a suitable casing or housing having a passageway for a film or inflammable strip; anti-friction members fixedly located therein; and co-acting reciprocatory and oscillatory anti-friction members therein.

6. An automatic valve for fireproof receptacles or magazines, comprising: a suitable casing or housing having a passageway for a film or inflammable strip; anti-friction members fixedly located therein; and a carriage mounted to oscillate in said housing and carrying anti-friction members adapted to co-act with said fixedly located anti-friction members.

7. An automatic valve for fireproof receptacles or magazines, comprising: a suitable casing or housing having a passageway for a film or inflammable strip; anti-friction members fixedly located therein; and a carriage mounted in unstable equilibrium to oscillate in said housing and carrying anti-friction members adapted to co-act with said fixedly located anti-friction members.

8. An automatic valve for fireproof receptacles or magazines, comprising: a suitable casing or housing having a passageway for a film or inflammable strip; and a plurality of rollers fixedly located in said housing and a plurality of rollers displaceably mounted therein, companion rollers being adapted to coöperate to include the film between each other to prevent communication of fire beyond said rollers.

9. An automatic film valve for fireproof receptacles or magazines of motion picture machines or the like, comprising: a suitable casing or housing adapted to be secured to the magazine and having an opening registering with a film opening of said magazine, said housing affording a passageway for the film; a set of rollers fixedly located in said housing; a carriage mounted in unstable equilibrium within said housing; and a set of rollers mounted in said carriage, the companion rollers of said sets being adapted to coöperate to include the film between each other to prevent communication of fire beyond said rollers.

10. An automatic film valve for fireproof receptacles or magazines of motion picture machines or the like, comprising: a suitable casing or housing adapted to be secured to the magazine and having an opening registering with a film opening of said magazine, said housing affording a passageway for the film; a set of rollers fixedly located in said housing; a carriage within said housing; a set of rollers mounted in said carriage, the companion rollers in each of said sets being adapted to coöperate to include the film between each other to prevent communication of fire beyond said rollers; and trunnions extending from said carriage and mounted in vertically slotted bearings of said housing.

Signed at New York, in the county of New York and State of New York this 21st day of February, A. D. 1917.

JEAN A. LE ROY.

Witnesses:
MORRIS LEIGHT,
ALEXANDER C. STETZ.